(12) United States Patent
Vakili

(10) Patent No.: US 7,249,614 B2
(45) Date of Patent: Jul. 31, 2007

(54) STRUCTURE AND METHOD FOR IMPROVING FLOW UNIFORMITY AND REDUCING TURBULENCE

(76) Inventor: Ahmad D. Vakili, 1 Clairemont Cir., Tullahoma, TN (US) 37388

( * ) Notice: Subject to any disclaimer, the term of this patent is extended or adjusted under 35 U.S.C. 154(b) by 543 days.

(21) Appl. No.: 10/894,616

(22) Filed: Jul. 20, 2004

(65) Prior Publication Data

US 2007/0137717 A1    Jun. 21, 2007

Related U.S. Application Data

(63) Continuation-in-part of application No. 10/084,164, filed on Feb. 28, 2002, now abandoned.

(60) Provisional application No. 60/271,613, filed on Feb. 26, 2001.

(51) Int. Cl.
*F15D 1/02* (2006.01)

(52) U.S. Cl. ..................... 138/39; 138/116; 73/170.01; 73/170.02; 73/147

(58) Field of Classification Search ................. 138/39, 138/42, 115–117; 366/337, 340, 341; 73/170.01, 73/170.02, 147

See application file for complete search history.

(56) References Cited

U.S. PATENT DOCUMENTS 3,484,953 A * 12/1969 Norheim, Jr. ............... 434/258
3,625,258 A * 12/1971 Phelps ......................... 138/115
3,853,003 A * 12/1974 Sorensen ..................... 73/147
4,529,414 A * 7/1985 Naess ............................ 95/46
5,099,879 A * 3/1992 Baird ..................... 137/561 A
5,392,815 A * 2/1995 Stuart ........................... 138/37
5,405,106 A * 4/1995 Chintamani et al. ....... 244/23 D
6,560,936 B2 * 5/2003 Satomi et al. ................ 52/174
6,694,808 B2 * 2/2004 Sawada et al. ............... 73/147
6,997,049 B2 * 2/2006 Lacey, Jr. .................... 73/147

* cited by examiner

*Primary Examiner*—James Hook
(74) *Attorney, Agent, or Firm*—Jason L. Hornkohl

(57) ABSTRACT

A structure for reducing turbulence and increasing flow uniformity in a flowing fluid in a wind tunnel, or a fluid channel, has a plurality of conduits or channels arranged into a conduit bundle. The conduit bundle has a number of parallel conduits with plurality of perforations on the inner side walls of the conduit. As the fluid flows through the conduit bundle the sides of the conduits reduce lateral turbulence while the perforations minimize pressure gradients in the flowing fluid in adjacent conduits, resulting in isotropic turbulence. The invention is particularly useful in testing aircraft, improving engine performance, and fluid mechanics applications.

20 Claims, 4 Drawing Sheets

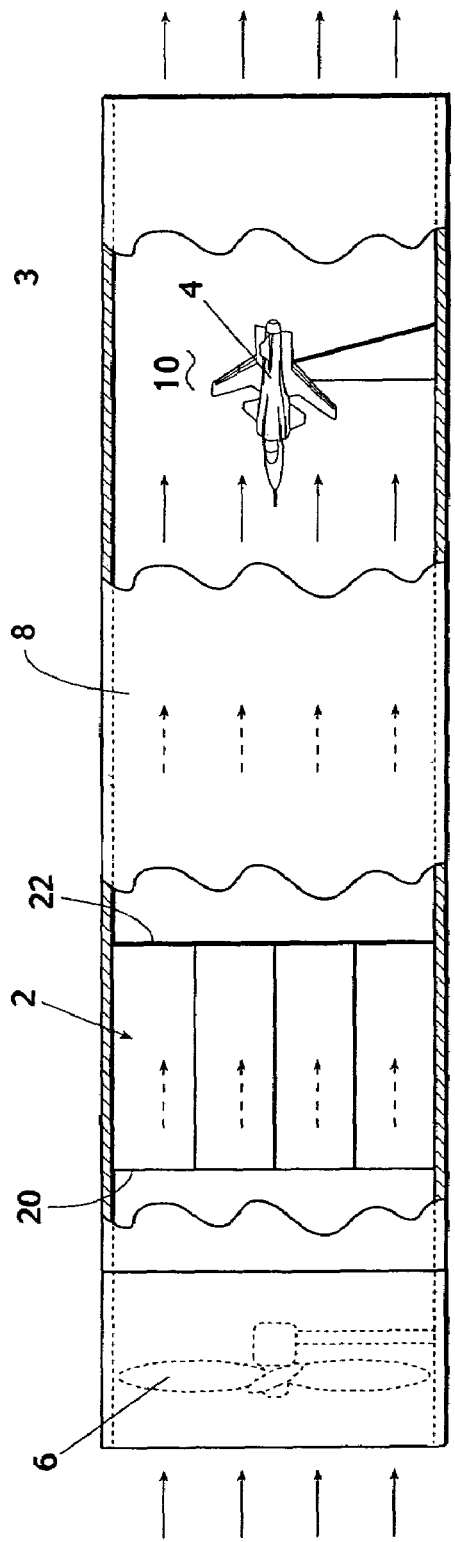
Fig. 1
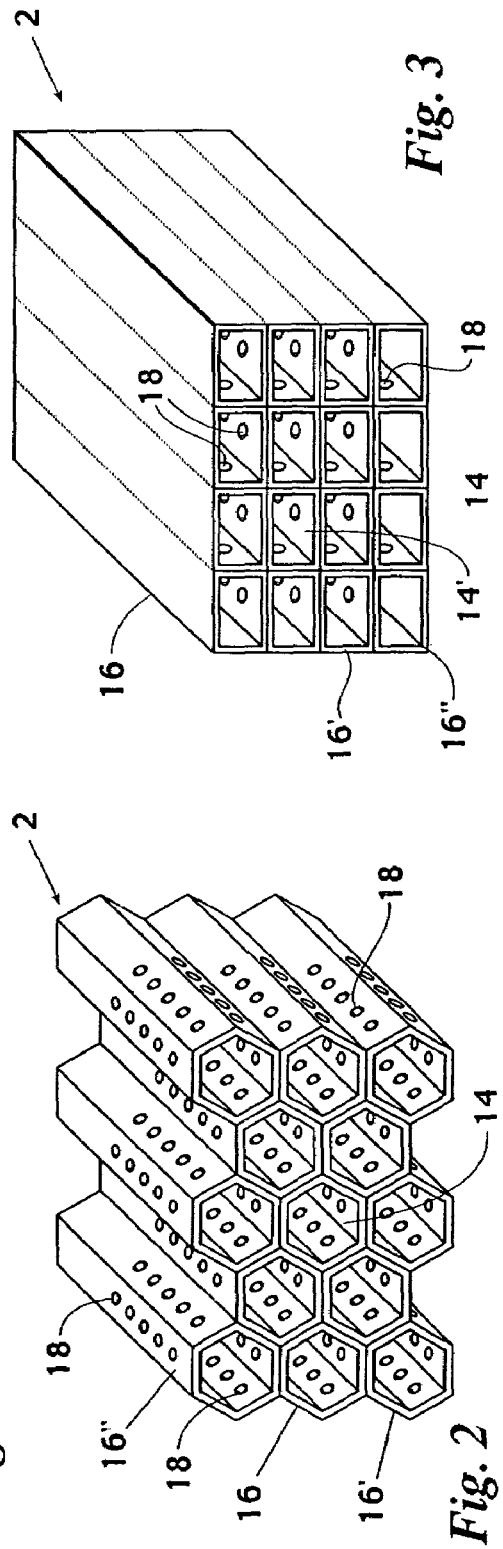
Fig. 2
Fig. 3

STRUCTURE AND METHOD FOR IMPROVING FLOW UNIFORMITY AND REDUCING TURBULENCE

CROSS REFERENCE TO RELATED APPLICATIONS

The present application is a continuation-in-part of, and claims priority from, application Ser. No. 10/084,164, filed on Feb. 28, 2002, now abandoned, which claimed priority from provisional application Ser. No. 60/271,613, filed on Feb. 26, 2001.

FIELD OF THE INVENTION

The invention disclosed herein broadly relates to the field of fluid flow non-uniformity and turbulence control. More particularly, the present invention relates to the use of a honeycomb structured conduit bundle for altering fluid flow non-uniformity to produce highly uniform flows with low turbulence and acoustic attenuation that is particularly useful for managing flow in a wind tunnel.

BACKGROUND OF THE INVENTION

When dealing with flowing fluids, it is often desirable to reduce the non-uniformity and turbulence in the flowing fluid. Generally speaking, any structure placed in a fluid will cause some turbulence when the fluid begins to flow. In addition, as the speed of a flowing fluid increases, the effects of the turbulence become more pronounced. For example, when testing aircraft in a wind tunnel, it is desirable to produce flowing air having a uniform flow with very low amount of inherent isotropic turbulence. Producing such a low turbulence fluid flow allows the users of the wind tunnel to more precisely monitor the effect of the flowing air in the tunnel on a model placed in the tunnel. If there is a large amount of turbulence in the flowing air in the tunnel, the turbulence will mask some of the effects of the model's structure on the fluid flow and vice versa.

The design of a flow straightening and Turbulence Reduction System (TRS) such as a wire-mesh screen for a wind tunnel application is based on a desire to maximize the attenuation of the flow unsteadiness and non-uniformity in the stilling chamber of the wind tunnel. To meet the very stringent flow uniformity and turbulence requirements in the test section where the test subject is positioned, mesh screens are integrated into the stilling chamber design. The stilling chamber is typically designed for operation at relatively lower flow speeds that have sub-critical Reynolds numbers based on the diameter of the fine wire used to create the screens. A Reynolds number is a non-dimensional number used to describe the turbulent nature of a flowing fluid. The Reynolds number of a flowing fluid is calculated as $R = \rho V D/\mu$ where $\rho$ is equal to the fluid density, V is equal to the velocity of the flowing fluid, D is equal to the characteristic distance or diameter, and $\mu$ is equal to the viscosity of the fluid. At Reynolds numbers larger than about 40 and higher, circular, cylindrical bodies, such as wire, positioned in a cross flow develop unsteady viscous wakes. The viscous wake is convectively unstable and rolls into large-scale coherent rotational flow regions. At higher Reynolds numbers, this is called the Karman vortex street and is composed of positive and negative vorticity that is present in concentrated patterns. These vortices develop higher frequency instabilities and eventually decay into turbulence.

The design of a Turbulence Reduction System (TRS) for most wind tunnels is based not only on modifying and reducing turbulence generated in the flow circuit by turbulence producing sources such as fans, heaters, coolers, turning vanes etc., but also on insuring that the turbulence generated by the TRS itself is small or negligible. TRS is generally formed by combination of perforated plates, honeycombs, and screens. Power losses associated with the performance of the TRS are proportional to the square of flow velocity through them. To reduce power consumed by TRS and to meet flow uniformity requirements, the stilling chamber is made as large as practically possible to lower the velocity in the chamber and the screen wire diameter is selected to be very small to achieve sub-critical Reynolds numbers. For large wind tunnels, there are at least two problems associated with this methodology. The first problem is that a wire screen extended over a large span does not retain its intended planar shape. The screen is deformed into a somewhat spherical shape that changes the flow direction in proportion to the local inclination of the screen relative to the flow upstream of the screen. This deformation is the result of a pressure drop that occurs when the fluid flows through the screen. The flow downstream of the deformed screen is, therefore, non-uniform and produces flow angularity in the test section. The second problem is the large required size of the stilling chamber necessary to produce the contraction ratio that is essential to reducing flow stream turbulence close to the desired value.

On the basis of both cost and mechanical considerations, the stilling chamber size requirement is especially limiting for the design of high Reynolds' number facilities which are often pressurized. Therefore, in high Reynolds number facilities, the stilling chamber is typically smaller in diameter, has a lower contraction ratio, and has a higher flow velocity for a given test section velocity than a non-pressurized tunnel of the same test section size. This places two contradictory requirements on the screens. The wire diameter must be kept small to operate at sub-critical Reynolds numbers. However, the wire diameter must be increased to reduce deformation due to increased loads on the screen and in turn, increases the turbulence level in the test section and requires a longer, and more expensive, contraction section to provide for increased decay of turbulence exiting the screen.

Thus, the current methods for reducing turbulence in a wind tunnel are to make the walls of the tunnel as smooth as possible and to place a screen across the fluid flow in the wind tunnel. Unfortunately, the smoothness of the walls does not help reduce turbulence in the center of the fluid flow and the screens tend to bend and produce turbulent vortices at higher flow velocities. Therefore, an improved structure and method for reducing turbulence in a wind tunnel are needed.

There are many other instances where it is desirable to decrease the turbulence and increase the flow uniformity of a fast flowing fluid. For example, with regard to engines, it is desirable to manage the flow of gas and air into the engine to increase the efficiency and the uniformity of the performance of the engine. This is typically accomplished by injecting the gas into the combustion chamber with a nozzle that creates a fairly uniform mixture of gas and air. In addition, valves are used to precisely control the amounts of gas and air injected into the engine. However, there are currently no methods for reducing the internal turbulence in the flowing fuel and air mixture itself. Turbulence in these mixtures results in small changes in the amount of fuel or air provided to the engine and in the uniformity of fuel air mixture. This variability in flow uniformity reduces the engines' overall performance and efficiency. Therefore, there is a need in the prior art for a method and structure for more effectively reducing turbulence and insuring flow uniformity in an engine.

SUMMARY OF THE INVENTION

An application of the present invention is directed toward a structure for establishing a uniformly flowing fluid. The structure includes a wind tunnel wherein the flowing fluid is contained within the wind tunnel. In an alternative embodiment, the wind tunnel is a nacelle of an engine. A propulsion means is positioned inside of the wind tunnel for accelerating the fluid through the wind tunnel. A target area having an inlet for receiving the flowing fluid is located in the wind tunnel wherein a uniform fluid flow is desired in the target area. The target area may be an area wherein it is desired to modify sound waves in the fluid. Flow generated sound waves are caused by the flow turbulence and, therefore, reduction of flow acoustics can be accomplished as well by reductions in flow turbulence. A turbulence filter is positioned in the wind tunnel upstream of the target area. The turbulence filter includes a plurality of substantially parallel channels having a fluid inlet, a fluid outlet, and sidewalls for reducing lateral turbulence in the fluid flow. The substantially parallel channels preferably have a hexagonal cross section. A plurality of openings in the sidewalls of a portion of each of the plurality of channels allows lateral fluid communication between the channels. In a most preferred embodiment, the openings are only on a portion of the channel sidewalls that is adjacent to the fluid inlet. The openings are dimensioned to provide a degree of lateral communication between the fluid flowing in adjacent channels to reduce non-uniformity and turbulence.

Yet another embodiment of the present invention is directed toward an apparatus for establishing a uniform fluid flow in a fluid channel. The apparatus includes a wind tunnel or fluid channel that has a propulsion means positioned therein for creating a fluid flow inside of the wind tunnel. A target chamber is positioned inside of the wind tunnel wherein a uniform, low turbulence fluid flow is desired. In a most preferred embodiment, an aircraft model is positioned in the target area. A stilling chamber is positioned upstream of the target chamber inside of the wind tunnel. A conduit bundle is positioned in the stilling chamber for reducing turbulence in the fluid flow. The conduit bundle includes a plurality of longitudinal channels that receive the fluid flow from the propulsion means wherein each longitudinal channel has a plurality of transverse perforations that allow for fluid flow through adjacent conduits. Preferably, the channels have approximately equal cross sectional areas. The transverse perforations are dimensioned to allow sufficient lateral fluid communication between the channels to substantially equalize the fluid pressure in each channel. The density of the transverse perforations per unit length of conduit varies for at least some of the conduits.

Yet another embodiment of the present invention is directed toward a method of establishing a uniform fluid flow in a flowing fluid. In accordance with the method, a fluid flow is moving through a wind tunnel toward a target area. In various embodiments, the wind tunnel or fluid channel may be in an acoustic filter or the nacelle of an engine. A uniform linear flow is established in the target area by passing the flowing fluid through a plurality of substantially parallel channels. A fluid pressure is equalized in the target area by providing openings for lateral fluid communication between adjacent channels. The openings are preferably only provided in channel side walls of a portion of the channels adjacent to a fluid inlet. In addition, the openings are preferably perpendicular to the channels and a density of the openings per unit length of the channel varies for at least some of the channels.

BRIEF DESCRIPTION OF THE DRAWINGS

FIG. 1 is a side view of a partial section of a wind tunnel constructed in accordance with a preferred embodiment of the present invention;

FIG. 2 is a perspective view of a conduit bundle of a preferred embodiment of the present invention that has at least a portion of the outer periphery conduits of the conduit bundle that have a porosity;

FIG. 3 is a perspective view of a conduit bundle of a preferred embodiment of the present invention that has the outer portion of the periphery conduits of the conduit bundle being non-porous and sealed one to the other;

DETAILED DESCRIPTION

Figure 4:
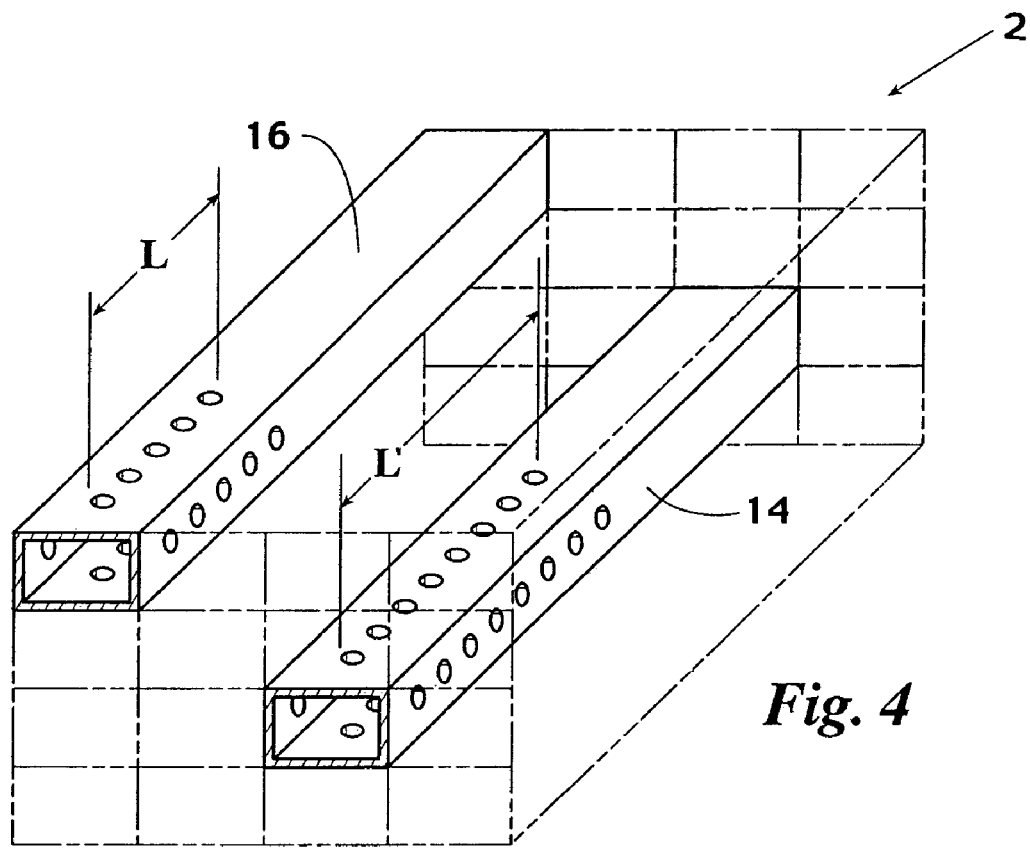
FIG. 4 is a perspective view of a conduit bundle of a preferred embodiment of the present invention having inner and outer conduits 14, 16 of the conduit bundle having porosity over respectively different lengths.

In accordance with the aforementioned deficiencies in the prior art, a new structure has been designed and developed by the present inventor for alleviating the design dilemma between screen deformation and induced vorticity such that high quality fluid flows can be established. In addition, the present invention is well suited to efficient and cost-effective manufacture. Therefore, the present invention provides new possibilities not previously available to wind tunnel designers, as well as designers other various applications.

Referring now to FIG. 1, a preferred embodiment of the present invention in the form of a conduit bundle 2 for use in the stilling chamber of a wind tunnel 3 is shown. The conduit bundle 2 eliminates the need for a screen in the stilling chamber of the wind tunnel 3. The wind tunnel 3 would typically be used for testing the aerodynamic properties of a test subject 4 such as a jet. The wind tunnel 3 has an apparatus such as a fan 6 for passing air through an elongated chamber or enclosure 8. The air is passed from the fan 6, through the conduit bundle 2 within the enclosure 8 where lower isotropic turbulence and vorticity is produced and, then, directly into the test or down stream chamber 10 where the item 4 being investigated is positioned. Preferably, the enclosure 8 is connected to and about the conduit bundle 2 at both inlet 20 and outlet ends 22 and functions as one means for maintaining the conduits contacting and positioned one relative to the others. The air discharging from the outlet or second end 22 of the conduit bundle 2 passes directly to the item 4, preferably without passing through the screen elements which were heretofore used to lower the isotropic turbulence. The conduit bundle 2 of the construction of this invention therefore eliminates the need for a screen element while producing improved desired downstream flow properties.

While the present invention is particularly useful in the form of conduits 2 in a wind tunnel 3, there exists a multiplicity of uses for various other embodiments of the present invention. The particular parameters of the invention such as the conduits' porosity, dimensions, positioning, etc. can be modified to suit a variety of situations wherein it is desired to control the flow and turbulence level of a flowing fluid. With regard to the figures, numeral 14 and associated prime numbers 14' and 14" are utilized to indicate any conduit residing at an internal location in the conduit bundle 2 and numeral 16 and associated prime numbers are used to indicate any conduit residing on the outer periphery of the conduit bundle 2.

A non-uniform flow represents a non-uniform total pressure distribution. The purpose of the transverse perforations 18 of each conduit 14 and 16 as hereinafter more fully described, is to provide a porosity that establishes near total pressure equilibrium between each of the cells or conduits 14 and 16 of the conduit bundle 2. As the non-uniform flow enters the honeycomb shaped conduits 14 and 16, the non-uniform total pressures in adjacent conduits 14 and 16 force fluid flows through perforations 18 to adjacent conduits 14 and 16. This relieves the pressure in conduits where the pressure is high and increases the pressure in conduits where it is low. Thus, each conduit 14 or 16 of a conduit bundle 2 is preferably in communication with the respective adjacent conduits 14 and 16 in the bundle 2. Therefore, at the exit plane of the conduit bundle 2, the flow out of each conduit 14 and 16 will be similar. Such flow pressure uniformity will produce a flow with minimal lateral disturbances or turbulence in the chamber 8. Therefore, the flow in the test section 10 will be uniform with less flow angularity and isotropic turbulence than that produced with a screen. In addition, the rigidity of the conduit bundle 2 eliminates the bending of the prior art screens.

Various transverse porosities are obtained through the various perforations' 18 design, shape, size, number, distribution, orientation, and location on its respective conduit 14 or 16. The location, pattern and percentage of the perforations 18, 18', and 18" in relation to the other geometrical aspects of the honeycomb bundle are at the core of the new invention and the observed performance improvements, as are described in more detail herein. Different transverse porosity shapes, sizes and distributions may be designed for different applications as desired. In applications where the transverse fluctuations are low, custom designed transverse distribution of holes spaced to result in a low porosity would be desirable. In flows with a high level of spatial non-uniformity, axial turbulence and high transverse flow fluctuations, a higher percentage and distribution of porosity would be required to reduce the intensity of the turbulence. Thus, the porosity is selected such that it is most effective on the type of turbulence present in the application.

The absence of screen elements in the construction of a wind tunnel using the subject invention reduces overall tunnel power consumption and flow angularity. The lower total pressure loss will manifest itself in a higher tunnel velocity for the same total power consumed. This will result in the saving of energy at comparable operating conditions. In general, distortions in the stilling chamber 10 have relatively small to moderate gradients. The medium gradients will only result in low speed flows through the transverse perforations 18. Therefore, a honeycomb bundle with perforations 18 will have only slightly higher losses than the solid honey comb of the same length and cell size. Similarly, since the transverse flow rate is expected to be small, the amplitude of the noise generated by the transverse perforations 18 is also quite small.

To validate structures built in accordance with embodiments of the present invention, four honeycomb structures having respective porosity densities of zero, 20%, 30% and 40% were tested by the present inventor. Hot-film measurements and Particle Image Velocimetery were used to obtain turbulence data in the form of flow maps from each of the test models. Different artificial disturbances were introduced into the flow upstream of the honeycombs. The introduced disturbances included circular cylinders, screen cylinders and solid ramps of different sizes. As a result of the experiments, it became clear that the present invention reduced turbulence and vorticity significantly more than a traditional screen. In addition, the pressure drop across the honeycomb structure is less than that across a given screen for any given flow uniformity. It further became clear that the perforations 18 in a honeycomb structure of the preferred embodiment of the present invention reduce the upstream turbulence more than a honeycomb with no perforations 18.

The invention is adapted for the construction of a conduit bundle 2 having conduits 14 and 16 of various lengths, thicknesses and cross-sectional configurations. The preferred thickness is dependent upon flow speed and uniformity, turbulence level, acoustic attenuation, available space and required ruggedness. The cross-sectional configuration is preferably hexagonal. However, the cross-sectional configuration can be circular, non-circular, elliptical, rectangular, square, triangular or any other desired shape. The conduits 14 and 16 are preferably formed in the finished conduit bundle 2 or in a sheet prior to forming a conduit from the sheet.

The perforations 18, 18' and 18" which form the porosity of the conduits 14 and 16 in FIG. 4 and permit lateral communication between the conduits 14 and 16 of the bundle 2 may be elliptical, rectangular, square, hexagonal, triangular or any other shape depending upon the desired effect upon the fluid turbulence. The preferred configuration is circular due to its ease of construction and a savings of labor and material. The perforations 18, 18' and 18" can be formed by various methods known in the art, such as by machine punch, for example. In addition, the perforations 18, 18' and 18" formed along the lengths of the conduits 14 and 16 of the conduit bundle 2, are preferably formed at right angles to the centerline of the respective conduits, and at pre-selected distances apart running from the inlet end 20 to the outlet end 22 of the conduit bundle 2.

The drawings show various configurations of the conduits and bundles and it should be understood that other construction variations fall within the scope of this invention so long as there is fluid communication between the conduits of a conduit bundle that is used in a wind tunnel to establish a uniform fluid flow. Referring to FIG. 2, the conduit wall portions on at least a portion of the outer periphery 16 of the conduit bundle 2 are porous over at least a portion of their length. Such construction provides for pressure alteration outside of the bundle and is particular useful where the bundle is contained within a vessel or conduit through which fluid is flowing. Examples of such a construction would be a wind tunnel and the nacelle of engine.

Figure 8:
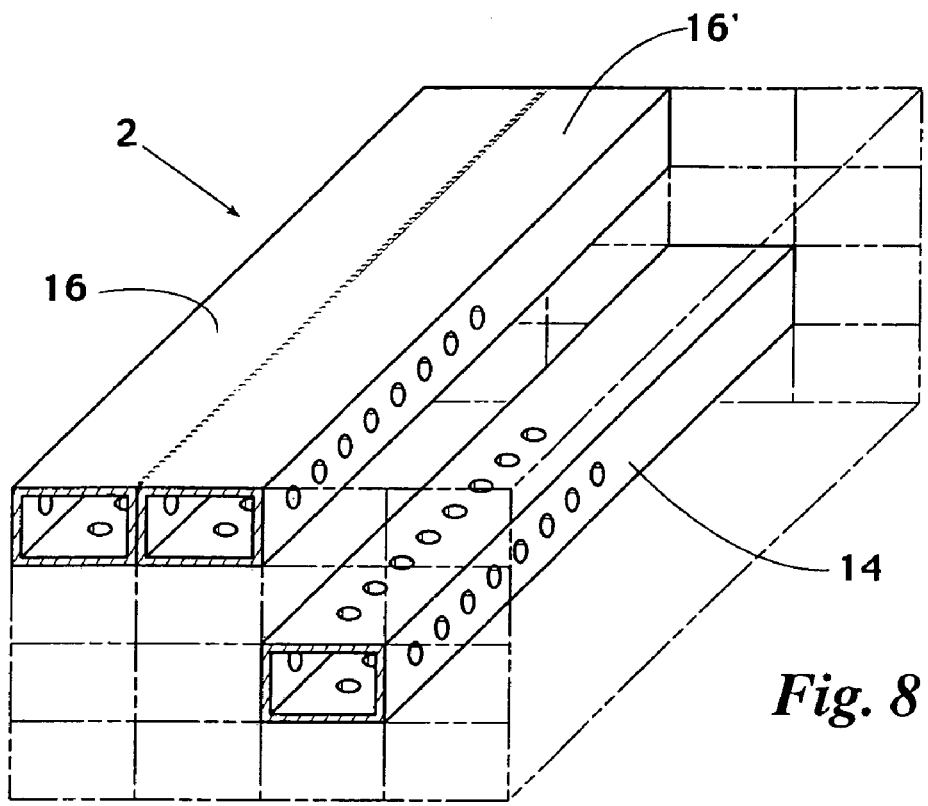
FIG. 8 is a partial perspective view of the conduits of a conduit bundle with the outer periphery wall portions of the outer periphery conduits of the bundle being free of porosity and the outer periphery conduits connected one to the other.

Referring to FIGS. 3 and 8, the conduit wall portions on the outer periphery of the conduit bundle 2 are non porous over their entire length and the outer periphery conduits 16 of the bundle are sealed, by welding or other known means for example, to adjacent conduits 16 of the bundle 2 along the length of the conduit bundle 2. By this construction, the conduit bundle 2 forms its own retaining walls and the need for a large conduit surrounding the bundle is eliminated. This welding also provides the means for maintaining the conduits touching and positioned one relative to the others. Another apparatus for maintaining the conduits relatively positioned would be metal bands surrounding the conduit bundle 2. Such construction could be advantageously be used in a large wind tunnel where the fan and downstream portions of the tunnel are sealingly connected to the respective inlet and outlet ends of the bundle.

Referring to FIG. 4, conduits 14 and 16 of the bundle each have a respective porosity present over only a portion L of their total length. It should be noted that this porosity portion L is generally adjacent to only the inlet ends of the conduits 14 and 16. In this construction, pressure equalization is achieved upon fluid passage through the initial portion of the bundle 2 and uniform linear flow is induced through the remaining portion of the conduits 14 and 16 and outwardly there from. One skilled in the art can readily determine the length of the perforations 18 desired once it is known the properties and volume of fluid expected to be passed through the bundle per unit time. Such determination would not require effort of an inventive nature. The porous length L of each conduit 2 can be substantially the same for each porous conduit 14 and 16 within the bundle 2 or can be of various lengths L, L'.

Figure 5:
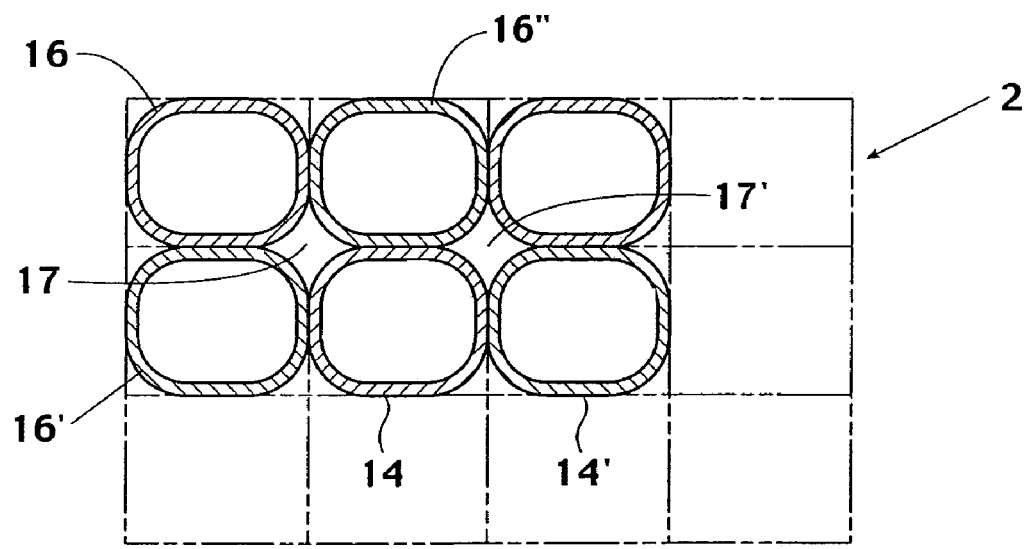
FIG. 5 is an end view of a conduit bundle of a preferred embodiment of the present invention diagrammatically showing the difference in area between the spaces between the conduits and the area of the conduit.

Referring to now FIG. 5, the cross-sectional configuration of the conduits 14 and 16 of the conduit bundle 2 can be of any configuration so long as any spaces 17, 17' between adjacent conduits of the conduit bundle have a volume less than the volume of one of the conduits 14 and 16 of the conduit bundle 2.

Figure 6:
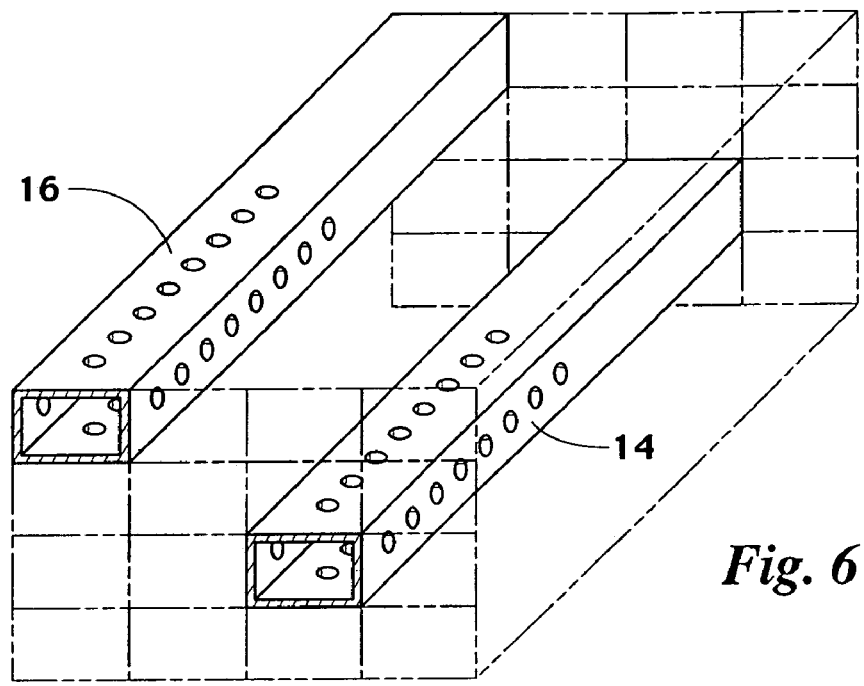
FIG. 6 is a side view of conduits of a conduit bundle which have uniform porosity per unit length in a direction from the inlet toward the outlet.

Referring now to FIG. 6, the area of porosity 18 opening per unit length for the respective conduit 14 and/or 16 of the conduit bundle is substantially uniform. However, the area of porosity 18 openings per unit length of the respective conduit 14 and/or 16 of the conduit bundle can increase or decrease in a direction from the inlet end 20 toward the outlet end 22 of the conduit bundle 2 for altering the fluid flow characteristics without departing from this invention. In such an embodiment, high density porosity 18 is used to reduce large scale turbulence in the form of big eddies into smaller, faster dissipating eddies while a lower density porosity 18 is used to reduce any residual turbulence.

Figure 7:
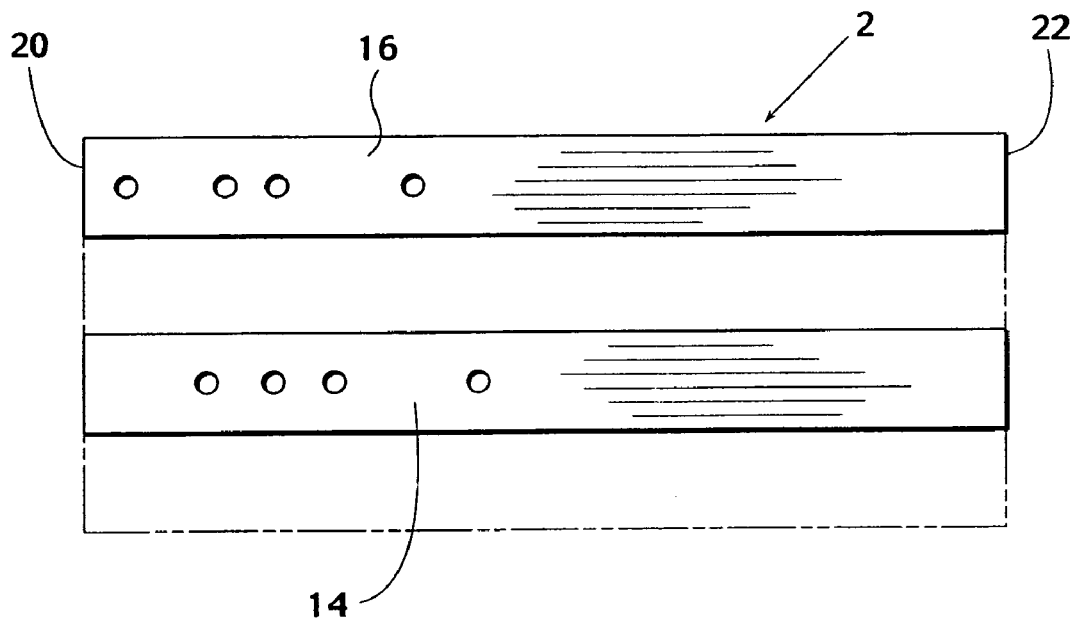
FIG. 7 is a side view of the conduits of the conduit bundle in which porosity per unit length in a direction from the inlet toward the outlet is randomly distributed.

Referring to FIG. 7, the porosity openings 18 are randomly positioned on the conduit in accordance with an alternative embodiment of the present invention. The openings formed through the wall of the conduit can be at right angles relative to the centerline or at any other angle without departing from this invention. However, it is preferred that the openings be formed at right angles, thereby saving time, labor and materials.

In another embodiment, a construction is provided wherein the first 20 and second ends 22 of the plurality of conduits 14 and 16 are closed and the enclosing means 8 is porous. Another construction that may be useful in certain applications is to have the enclosing means 8 non-porous. The particular configuration selected will depend upon the particular use that is being made of the bundle 2.

Figure 9:
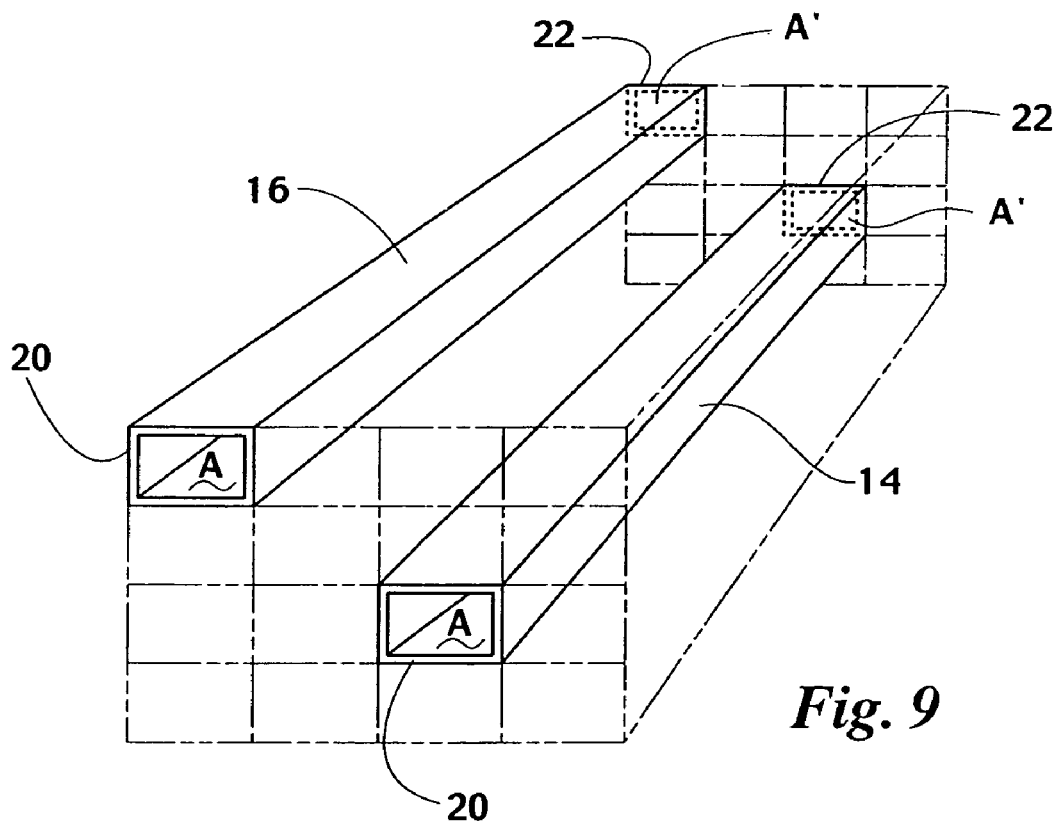
FIG. 9 is a partial perspective view of the conduits of the conduit bundle with the conduits having an inlet of different area than its outlet.

FIG. 9 shows an embodiment of this invention wherein one end 20 of the plurality of conduits has a cross-sectional open area A different than the cross-sectional area A' of the other end 22 of the conduits. Such construction provides a construction whereby one can provide a significant overall pressure drop or increase yet control the turbulence there from. Such an embodiment will have uses in diffusers, nozzles, turning ducts at locations upstream or downstream of turns, orifices and even for mixing applications.

What has been shown and discussed is a highly-simplified depiction of the present invention. Those skilled in the art will appreciate that other low-level components and connections are required in any practical application of the invention. Therefore, while there has been described what is presently considered to be the preferred embodiment, it will be understood by those skilled in the art that other modifications can be made within the spirit of the invention.

The invention claimed is:

1. A structure for establishing a uniformly flowing fluid, said structure comprising:
    a wind tunnel wherein said flowing fluid is contained within said wind tunnel;
    a propulsion means positioned inside of, or attached to, said wind tunnel for accelerating said fluid through said wind tunnel;
    a target area having an inlet for receiving said flowing fluid located in said wind tunnel wherein a uniform fluid flow is desired in said target area;
    a turbulence filter positioned in said wind tunnel upstream of said target area wherein said turbulence filter further comprises:
    a plurality of substantially parallel channels having a fluid inlet, a fluid outlet, and sidewalls for reducing lateral turbulence in the fluid flow; and
    a plurality of openings in the sidewalls of a portion of each of the plurality of channels to allow lateral fluid communication between the channels.

2. The structure of claim 1 wherein the substantially parallel channels have a hexagonal cross section.

3. The structure of claim 1 wherein said wind tunnel comprises a nacelle of an engine.

4. The structure of claim 1 wherein said target area is an area wherein it is desired to modify flow uniformity and sound waves in said fluid.

5. The structure of claim 1 wherein the openings are only on a portion of the channel sidewalls that is adjacent to the fluid inlet.

6. The structure of claim 1 wherein the openings are dimensioned to provide a degree of lateral communication between the fluid flowing in adjacent channels that reduces turbulence and improve flow uniformity.

7. An apparatus for establishing a uniform fluid flow:
    a wind tunnel having a propulsion means positioned therein for creating a fluid flow inside of the wind tunnel;
    a target chamber positioned inside of said wind tunnel wherein a uniform, low turbulence fluid flow is desired in said target chamber;
    a stilling chamber positioned upstream of said target chamber inside of said wind tunnel; and
    a conduit bundle positioned in said stilling chamber for reducing turbulence in the fluid flow wherein said conduit bundle comprises a plurality of longitudinal channels that receive the fluid flow from the propulsion means wherein each longitudinal channel has a plurality of transverse perforations that allow for fluid flow through adjacent conduits.

8. The apparatus of claim 7 wherein the transverse perforations are dimensioned to allow sufficient lateral fluid communication between the channels to substantially equalize the fluid pressure in each channel.

9. The apparatus of claim 7 wherein a density of the transverse perforations per unit length of conduit varies for at least some of the conduits.

10. The apparatus of claim 7 wherein the channels have approximately equal cross sectional areas.

11. The apparatus of claim 7 wherein an aircraft model is positioned in said target area.

12. The apparatus of claim 7 wherein said target area is an area wherein acoustic filtering is desired.

13. The apparatus of claim 7 wherein the channels have a hexagonal cross section.

14. A method of establishing a uniform fluid flow in a single phase fluid flowing through a conduit comprising:
  accelerating a fluid flow through a wind tunnel or fluid channel toward a target area;
  establishing a uniform linear flow in said target area by passing said flowing fluid through a plurality of substantially parallel channels; and
  equalizing a fluid pressure said target area by providing openings for lateral fluid communication between adjacent channels.

15. The method of claim 14 wherein the openings are only provided on channel side walls of a portion of said channels adjacent to a fluid inlet.

16. The method of claim 14 wherein said target area contains an aircraft model.

17. The method of claim 14 wherein said wind tunnel comprises an acoustic filter.

18. The method of claim 14 wherein said wind tunnel comprises a nacelle of an engine.

19. The method of claim 14 wherein said openings are perpendicular to the channels.

20. The method of claim 14 wherein a density of the openings per unit length of channel varies for at least some of the channels.

* * * * *